US012057048B2

(12) United States Patent
Pyun et al.

(10) Patent No.: US 12,057,048 B2
(45) Date of Patent: Aug. 6, 2024

(54) DISPLAY DEVICE HAVING SCALE FACTOR PROVIDER CONTROLLED BY TEMPERATURE SENSOR, CURRENT SENSOR, AND POWER CONTROLLER AND METHOD OF DRIVING THE SAME

(71) Applicant: SAMSUNG DISPLAY CO., LTD., Yongin-si (KR)

(72) Inventors: Ki Hyun Pyun, Yongin-si (KR); Hee Sook Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/307,536

(22) Filed: Apr. 26, 2023

(65) Prior Publication Data

US 2023/0410714 A1 Dec. 21, 2023

(30) Foreign Application Priority Data

Jun. 20, 2022 (KR) ........................ 10-2022-0075142

(51) Int. Cl.
*G09G 3/20* (2006.01)
*G09G 3/3233* (2016.01)

(52) U.S. Cl.
CPC ......... *G09G 3/2007* (2013.01); *G09G 3/2096* (2013.01); *G09G 3/3233* (2013.01); *G09G 2300/0842* (2013.01); *G09G 2320/0233* (2013.01); *G09G 2320/0247* (2013.01); *G09G 2320/041* (2013.01); *G09G 2330/028* (2013.01)

(58) Field of Classification Search
CPC .. G09G 3/2007; G09G 3/2096; G09G 3/3233; G09G 2300/0842; G09G 2320/0233; G09G 2320/0247; G09G 2320/041; G09G 2330/028; G09G 3/32; G09G 3/3225; G09G 3/3291; G09G 3/3688; G09G 5/18; G09G 3/3648; G09G 3/3208
See application file for complete search history.

(56) References Cited

U.S. PATENT DOCUMENTS 7,446,749 B2 11/2008 Lee et al.
7,573,447 B2 8/2009 Oh et al.
7,656,473 B2 2/2010 Ha et al.
(Continued)

FOREIGN PATENT DOCUMENTS

KR 10-0954333 4/2010
KR 10-1096720 12/2011
(Continued)

*Primary Examiner* — Richard J Hong
(74) *Attorney, Agent, or Firm* — F. Chau & Associates, LLC

(57) ABSTRACT

A display device includes a display panel including a plurality of pixels, a timing controller, a data driver and a scale factor. The timing controller calculates a frame load value corresponding to an image frame of input image data and generates image data by scaling grayscale values of the input image data using a scale factor. The data driver generates a data signal corresponding to the image data and supplies the data signal to the pixels. The scale factor generating circuit sets a reference range based on a temperature of the display panel and a global current value that flows through the pixels, and generates the scale factor included within the reference range based on the frame load value and the global current value.

17 Claims, 10 Drawing Sheets

(56) References Cited

U.S. PATENT DOCUMENTS

| | | | | |
|---|---|---|---|---|
| 10,062,324 | B2 | 8/2018 | Kim et al. | |
| 2010/0103083 | A1* | 4/2010 | Shin | G09G 3/3208 345/76 |
| 2012/0249619 | A1* | 10/2012 | Furukawa | G09G 3/3648 345/691 |
| 2014/0198091 | A1* | 7/2014 | Shin | G09G 3/3291 345/82 |
| 2015/0379967 | A1* | 12/2015 | Kim | G09G 5/18 345/82 |
| 2017/0213493 | A1* | 7/2017 | Han | G09G 3/3208 |
| 2018/0158423 | A1* | 6/2018 | Kim | G09G 3/3688 |
| 2020/0312235 | A1* | 10/2020 | Kim | G09G 3/3225 |
| 2020/0357344 | A1* | 11/2020 | Pyun | G09G 3/3233 |
| 2021/0012704 | A1* | 1/2021 | Pyun | G09G 3/32 |

FOREIGN PATENT DOCUMENTS

| | | |
|---|---|---|
| KR | 10-1295551 | 8/2013 |
| KR | 10-2412107 | 6/2022 |

* cited by examiner

DISPLAY DEVICE HAVING SCALE FACTOR PROVIDER CONTROLLED BY TEMPERATURE SENSOR, CURRENT SENSOR, AND POWER CONTROLLER AND METHOD OF DRIVING THE SAME

CROSS-REFERENCE TO RELATED APPLICATION

The application claims priority under 35 U.S.C. § 119 to Korean Patent Application No. 10-2022-0075142, filed on Jun. 20, 2022, the disclosure of which is hereby incorporated by reference in its entirety.

TECHNICAL FIELD

Embodiments of the present invention relate to a display device and a method of driving the same.

DISCUSSION OF RELATED ART

A display device may include pixels, and image frames displayed by the pixels may have different load values. For example, an image frame corresponding to a bright image may have a large load value, and an image frame corresponding to a dark image may have a small load value.

The amount of current used by the pixels may vary according to the load value. Accordingly, an appropriate current should be supplied to the pixels in response to the load value of the image frame.

SUMMARY

Embodiments of the present invention provide a display device capable of supplying an appropriate current to pixels in response to a change in ambient temperature, and a method of driving the same.

A display device according to embodiments of the present invention includes a display panel including a plurality of pixels, a timing controller, a data driver and a scale factor generating circuit. The timing controller calculates a frame load value corresponding to an image frame of input image data and generates image data by scaling grayscale values of the input image data using a scale factor. The data driver generates a data signal corresponding to the image data and supplies the data signal to the pixels. The scale factor generating circuit sets a reference range based on a temperature of the display panel and a global current value that flows through the pixels, and generates the scale factor included within the reference range based on the frame load value and the global current value.

In an embodiment, a maximum value of the reference range is a first reference value, and a minimum value of the reference range is a second reference value.

In an embodiment, the scale factor generating circuit determines the first reference value and the second reference value according to the temperature of the display panel.

In an embodiment, the scale factor generating circuit determines the first reference value as a first value and determines the second reference value as a second value different from the first value when the temperature of the display panel is equal to or less than a reference temperature, and the scale factor generating circuit determines the first reference value and the second reference value having smaller values as the temperature of the display panel increases when the temperature of the display panel is higher than the reference temperature.

In an embodiment, the first value has a value of 1, and the second value has a value smaller than the first value.

In an embodiment, the reference temperature corresponds to room temperature.

In an embodiment, the scale factor generating circuit determines the second reference value by comparing the global current value with a reference current value.

In an embodiment, the scale factor generating circuit determines the second reference value having a smaller value as a length of a section in which the global current value is greater than the reference current value for a unit time increases.

In an embodiment, the display panel is divided into a plurality of blocks. The scale factor generating circuit includes a unit target current value generator circuit that generates a unit target current value based on the global current value corresponding to a reference block among the blocks.

In an embodiment, the scale factor provider further includes a first scale factor data generator circuit that generates first scale factor data including the first reference value and a (2-1)th reference value based on the temperature of the display panel, and a second scale factor data generator circuit that generates second scale factor data including a (2-2)th reference value based on a counting signal generated by comparing the global current value with the reference current value.

In an embodiment, the scale factor provider further includes a first scale factor calculator circuit that generates a target current value based on the unit target current value and the frame load value, and generates a first calculated value based on the target current value and the global current value.

In an embodiment, the scale factor generating circuit further includes a second scale factor calculator circuit that generates a second calculated value corresponding to the scale factor based on the first scale factor data, the second scale factor data, and the first calculated value.

In an embodiment, the second scale factor calculator circuit determines a smaller value among the (2-1)th reference value and the (2-2)th reference value as the second reference value.

In an embodiment, the second scale factor calculator circuit generates the second calculated value having a same value as the first calculated value when the first calculated value is included within the reference range.

In an embodiment, the second scale factor calculator circuit generates the second calculated value having a same value as the first reference value when the first calculated value is greater than the reference range.

In an embodiment, the second scale factor calculator circuit generates the second calculated value having a same value as the second reference value when the first calculated value is less than the reference range.

In an embodiment, the display device further includes a power supply that supplies a first power source voltage and a second power source voltage different from the first power source voltage to the display panel, and a power controller that generates a power control signal that controls the power supply based on a comparison result of the global current value and the reference current value. The power supply may reduce a voltage level of the first power source voltage based on the power control signal when the global current value is greater than the reference current value.

A method of driving a display device including a display panel including a plurality of pixels according to embodiments of the present invention includes calculating a frame load value corresponding to an image frame of input image data, setting a reference range based on a temperature of the display panel and a global current value flowing through the pixels, generating a scale factor included within the reference range based on the frame load value and the global current value, generating image data by scaling grayscale values of the input image data using the scale factor, and generating a data signal corresponding to the image data and supplying the data signal to the pixels.

In an embodiment, a maximum value of the reference range may be a first reference value, and a minimum value of the reference range may be a second reference value.

In an embodiment, the first reference value may be determined according to the temperature of the display panel, and the second reference value may be determined according to the temperature of the display panel and a comparison result of the global current value and a reference current value.

BRIEF DESCRIPTION OF THE DRAWINGS

The above and other features of the present invention will become more apparent by describing in detail embodiments thereof with reference to the accompanying drawings.

DETAILED DESCRIPTION OF THE EMBODIMENTS

Figure 1:
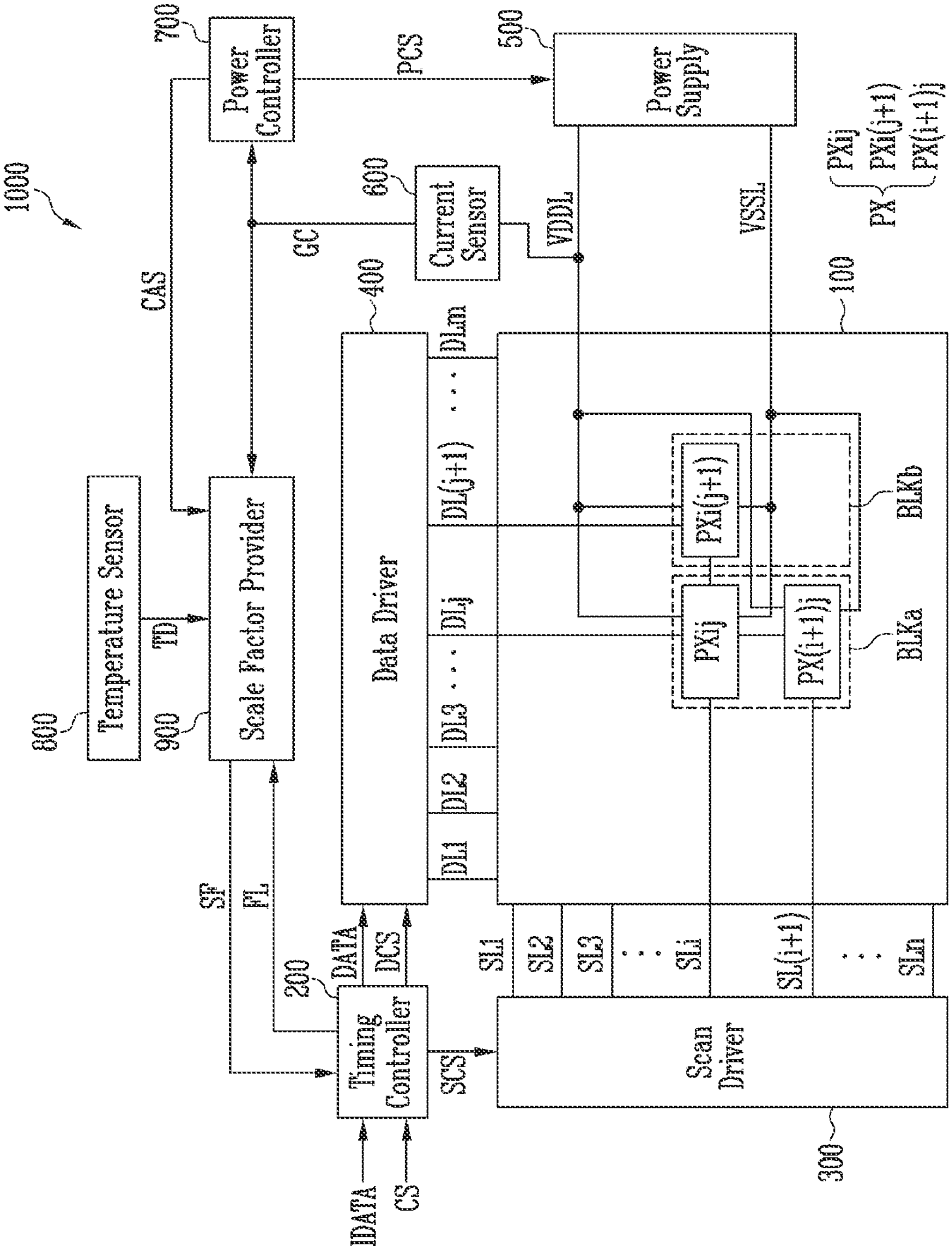
FIG. 1 is a block diagram illustrating a display device according to embodiments of the present invention.

Embodiments of the present invention will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating a display device according to embodiments of the present invention.

Referring to FIG. 1, a display device 1000 according to embodiments of the present invention includes a display panel 100, a timing controller 200, a scan driver 300, a data driver 400, a power supply 500, a current sensor 600, a power controller 700, a temperature sensor 800, and a scale factor provider 900. The scale factor provider 900 may also be referred to herein as a scale factor generating circuit.

The display panel 100 (or pixel unit) may include pixels PX. Each of the pixels PX may be connected to a corresponding data line and a corresponding scan line. Here, a pixel PXij may mean a pixel whose scan transistor is connected to an i-th scan line SLi and a j-th data line DLj, where i and j may be natural numbers. A pixel PXi(j+1) may mean a pixel whose scan transistor is connected to the i-th scan line SLi and a (j+1)th data line DL(j+1). Also, a pixel PX(i+1)j may mean a pixel whose scan transistor is connected to an (i+1)th scan line SL(i+1) and the j-th data line DLj.

The pixels PX may be connected to a first power source line VDDL and a second power source line VSSL. The pixels PX may receive a first power source voltage and a second power source voltage from the power supply 500 through the first power source line VDDL and the second power source line VSSL, respectively. The first power source voltage and the second power source voltage may be voltages for driving the pixels PX, and the voltage level of the first power source voltage may be higher than the voltage level of the second power source voltage. For example, the first power source voltage may be a positive voltage, and the second power source voltage may be a negative voltage.

The pixels PX may be commonly connected to the first power source line VDDL. Also, the pixels PX may be commonly connected to the second power source line VSSL. However, the connection relationship between the pixels PX and the power source lines is not limited thereto. For example, the pixels PX may be connected to different second power source lines. As another example, the pixels PX may be connected to different first power source lines.

The display panel 100 may be divided into a plurality of blocks BLKa and BLKb. Each of the blocks BLKa and BLKb may include at least one pixel. For example, a first block BLKa may include the pixels PXij and PX(i+1)j, and a second block BLKb may include the pixel PXi(j+1).

The timing controller 200 may receive input image data IDATA and a control signal CS from outside of the timing controller 200. Here, the control signal CS may include, for example, a synchronization signal, a clock signal, and the like. Also, the input image data IDATA may include at least one image frame.

The timing controller 200 may generate a first control signal SCS (or a scan control signal) and a second control signal DCS (or a data control signal) based on the control signal CS. The timing controller 200 may supply the first control signal SCS to the scan driver 300 and supply the second control signal DCS to the data driver 400.

The first control signal SCS may include, for example, a scan start signal, a clock signal, and the like. The scan start signal may be a signal that controls the timing of a scan signal. The clock signal included in the first control signal SCS may be used to shift the scan start signal.

The second control signal DCS may include, for example, a source start signal, a clock signal, and the like. The source start signal may control a sampling start time of data. The clock signal included in the second control signal DCS may be used to control a sampling operation.

In an embodiment, the timing controller 200 may calculate a frame load value FL corresponding to each image frame of the input image data IDATA. Here, the frame load value FL may correspond to grayscale values of the image frame. For example, as the sum of the grayscale values of the image frame increases, the frame load value FL of the corresponding image frame may increase.

For example, in a full-white image frame, the frame load value FL may be 100, and in a full-black image frame, the frame load value FL may be 0. Here, the full-white image frame may mean an image frame in which all of the pixels PX of the display panel 100 are set to maximum grayscales (white grayscales) and emit light with maximum luminance. In addition, the full-black image frame may mean an image frame in which all of the pixels PX of the display panel 100 are set to minimum grayscales (black grayscales), and thus, do not emit light. For example, the frame load value FL may have a value between 0 and 100.

In an embodiment, the timing controller 200 may calculate the frame load value FL for each of the blocks BLKa and BLKb of the display panel 100. That is, the frame load value FL may include frame load values corresponding to each of the blocks BLKa and BLKb.

In addition, the timing controller 200 may provide the calculated frame load value FL to the scale factor provider 900, and may scale grayscale values of the input image data IDATA using a scale factor SF received from the scale factor provider 900. The scale factor SF may be commonly applied to all of the pixels PX of the display panel 100. That is, the grayscale values of the input image data IDATA may be scaled at the same rate based on the scale factor SF.

The timing controller 200 may generate image data DATA by rearranging the input image data IDATA in which the grayscale values are scaled, and may supply the image data DATA to the data driver 400.

The scan driver 300 may receive the first control signal SCS from the timing controller 200 and supply scan signals to scan lines SL1 to SLn based on the first control signal SCS, where n is a natural number. For example, the scan driver 300 may sequentially supply the scan signals to the scan lines SL1 to SLn. When the scan signals are sequentially supplied, the pixels PX may be selected in units of horizontal lines (or units of pixel rows), and a data signal may be supplied to the selected pixels PX. To this end, the scan signal may be set to a gate-on voltage (a low voltage or a high voltage) so that a transistor included in each of the pixels PX and receiving the scan signal may be turned on.

The data driver 400 may receive the image data DATA and the second control signal DCS from the timing controller 200, and supply data signals (or data voltages) corresponding to the image data DATA to data lines DL1 to DLm in response to the second control signal DCS, where m is a natural number. The data signals supplied to the data lines DL1 to DLm may be supplied to the pixels PX selected by the scan signals. To this end, the data driver 400 may supply the data signals to the data lines DL1 to DLm to be synchronized with the scan signal.

In this case, since the image data DATA is generated based on the input image data IDATA whose grayscale values are scaled by the scale factor SF, the data driver 400 may supply the data signals corresponding to the scaled grayscale values to the data lines DL1 to DLm. For example, the data driver 400 may apply the data signal corresponding to the scaled grayscale value of the pixel PXij to the j-th data line DLj, and may apply the data signal corresponding to the scaled grayscale value of the pixel PXi(j+1) to the (j+1)th data line DL(j+1).

The power supply 500 may supply the first power source voltage and the second power source voltage to the display panel 100. For example, the power supply 500 may supply the first power source voltage to the display panel 100 through the first power source line VDDL and may supply the second power source voltage to the display panel 100 through the second power source line VSSL. In addition, the power supply 500 may provide at least one power source voltage utilized for driving to at least one of the timing controller 200, the scan driver 300, and the data driver 400. In an embodiment, the power supply 500 may be implemented as a power management integrated circuit (PMIC).

In an embodiment, the power supply 500 may change the voltage level of the first power source voltage provided to the first power source line VDDL based on a power control signal PCS provided from the power controller 700. For example, the power supply 500 may decrease the voltage level of the first power source voltage so that a difference between the first power source voltage and the second power source voltage is reduced based on the power control signal PCS. However, this is only an example, and embodiments of the present invention are not limited thereto. For example, according to embodiments, the power supply 500 may change the voltage level of the second power source voltage provided to the second power source line VSSL based on the power control signal PCS.

The current sensor 600 may be connected to the first power source line VDDL commonly connected to the pixels PX. The current sensor 600 may sense the current flowing through the first power source line VDDL to generate a global current value GC. The current sensor 600 may provide the global current value GC to the power controller 700 and the scale factor provider 900. Here, the global current value GC may correspond to the current commonly supplied to all of the pixels PX through the first power source line VDDL. However, the present invention is not limited thereto. For example, according to embodiments, the current sensor 600 may be connected to the second power source line VSSL commonly connected to the pixels PX to sense the current flowing through the second power source line VSSL.

The power controller 700 may generate the power control signal PCS based on the global current value GC provided from the current sensor 600 and provide the power control signal PCS to the power supply 500.

In an embodiment, the power controller 700 may generate the power control signal PCS for changing the voltage level of the first power source voltage supplied to the first power source line VDDL based on a value of the current applied to or flowing through the display panel 100 according to the supply of the first power source voltage and the second power source voltage.

In an embodiment, the power controller 700 may generate the power control signal PCS for changing the voltage level of the first power source voltage by comparing the global current value GC provided from the current sensor 600 with a reference current value. For example, when the global current value GC is greater than the reference current value, the power controller 700 may generate the power control signal PCS for controlling the power supply 500 so that the voltage level of the first power source voltage supplied to the first power source line VDDL is changed from a first voltage level to a second voltage level. For example, the first voltage level may be higher than the second voltage level.

When the voltage level of the first power source voltage supplied to the display panel 100 through the first power source line VDDL is changed, a gate-source voltage (for example, a voltage applied between a gate electrode and a source electrode) of a driving transistor (for example, the first transistor T1 of FIG. 2) of each of the pixels PX may be changed in response to the voltage level of the first power source voltage. In this case, the current flowing through a light emitting element of each of the pixels PX may be changed, and correspondingly, the current flowing through the entire display panel 100 (for example, the global current value GC) may be changed.

Here, when the voltage level of the first power source voltage decreases from the first voltage level to the second voltage level or less, a value of the current flowing through the light emitting element of each of the pixels PX may be reduced, and accordingly, a value of the current flowing through the entire display panel 100 may be reduced. According to embodiments of the present invention, when the value of the current (for example, the global current value GC measured by the current sensor 600) flowing through the display panel 100 increases (for example, when the value of the current flowing through the display panel 100 is greater than the reference current value), the power controller 700 (or the display device 1000) may change the voltage level of the first power source voltage by using a method of decreasing the gate-source voltage of the driving transistor of each of the pixels PX. As a result, an excessive increase in current applied to or flowing through the display panel 100 (e.g., an overcurrent) may be prevented or reduced.

In an embodiment, the power controller 700 may generate a counting signal CAS by comparing the global current value GC provided from the current sensor 600 with the reference current value. For example, the power controller 700 may generate the counting signal CAS by comparing the global current value GC with the reference current value and counting the length of a section in which the global current value GC is greater than the reference current value for a unit time. The power controller 700 may provide the counting signal CAS to the scale factor provider 900.

According to some embodiments, the display device 1000 may emit light from a block set as a reference block among the blocks BLKa and BLKb. In this case, the current sensor 600 may generate the global current value GC by sensing the current flowing through the first power source line VDDL, and may supply the global current value GC to the scale factor provider 900. The scale factor provider 900 may store a unit target current value corresponding to the global current value GC in a memory (for example, the third memory 970 of FIG. 4).

The operation of storing the unit target current value may be performed once when the display device 1000 is powered-on. However, the present invention is not limited thereto. For example, according to embodiments, the time point and number of times to store the unit target current value may be variously set.

In addition, the scale factor provider 900 may generate a target current value based on the unit target current value and the frame load value FL, and may generate the scale factor SF by comparing the global current value GC provided by the current sensor 600 with the target current value. For example, the scale factor provider 900 may determine a ratio between the target current value and the global current value GC as the scale factor SF. For example, when the global current value GC is greater than the target current value, the scale factor provider 900 may determine the scale factor SF so that the grayscale values of the pixels PX are scaled to be smaller. As another example, when the global current value GC is less than the target current value, the scale factor provider 900 may determine the scale factor SF so that the grayscale values of the pixels PX are greatly scaled. The above-described driving process may be referred to as global current management (GCM).

The value of the current flowing through the display panel 100 may be changed according to an ambient temperature of the display device 1000. For example, when the ambient temperature rises, as the mobility of the driving transistor (for example, the first transistor T1 of FIG. 2) of each of the pixels PX increases, a value of the current flowing through the driving transistor to the light emitting element may increase. Accordingly, the value of the current flowing through the display panel 100 may increase. In this case, since an appropriate current is not supplied to the pixels PX, an undesired effect in which the pixels PX emit light with a luminance different from the target luminance may occur.

In addition, when the value of the current flowing through the display panel 100 increases as the ambient temperature of the display device 1000 increases, as described above, according to the operation of the power controller 700, which may prevent or reduce overcurrent from occurring, the frequency with which the voltage level of the first power source voltage supplied to the first power source line VDDL is changed may increase. In this case, as the frequency of changing the luminance of an image displayed by the display panel 100 increases, the display quality of the image may be deteriorated (for example, as the frequency of changing the luminance of the displayed image increases, a flicker phenomenon may be visually recognized by a user).

In response to the ambient temperature of the display device 1000 as described above, the display device 1000 (or the scale factor provider 900) according to embodiments of the present invention may determine the scale factor SF in consideration of the ambient temperature of the display device 1000 and the degree to which the value of the current flowing through the display panel 100 for a unit time becomes greater than the reference current value.

For example, the temperature sensor 800 may generate temperature data TD by sensing the ambient temperature of the display device 1000 (or the display panel 100). The temperature sensor 800 may provide the temperature data TD to the scale factor provider 900.

Also, as described above, the power controller 700 may provide the counting signal CAS to the scale factor provider 900.

In an embodiment, the scale factor provider 900 may receive the temperature data TD and the counting signal CAS, and may set a reference range for determining the scale factor SF according to the ambient temperature of the display device 1000 (or the display panel 100) and the degree to which the value of the current flowing through the display panel 100 for a unit time becomes greater than the reference current value. When the scale factor provider 900 performs the above-described global current management, the scale factor SF may be determined within the reference range and provided to the timing controller 200.

As described above, the display device 1000 (or the scale factor provider 900) according to embodiments of the present invention may perform a global current control operation in consideration of the ambient temperature of the display device 1000 (or the display panel 100) and the degree to which the value of the current flowing through the display panel 100 for a unit time becomes greater than the reference current value. Accordingly, an appropriate current may be supplied to the pixels PX in response to a change in the ambient temperature of the display device 1000 (or the display panel 100), and deterioration of image quality that may be unintentionally caused due to the operation of the power controller 700 may be prevented or reduced.

The scale factor provider 900 may be configured as a separate IC together with the timing controller 200. However, the present invention is not limited thereto. For example, according to embodiments, all or part of the scale factor provider 900 may be configured as an IC integrated with the timing controller 200. As another example, all or part of the scale factor provider 900 may be implemented in software in the timing controller 200.

Figure 2:
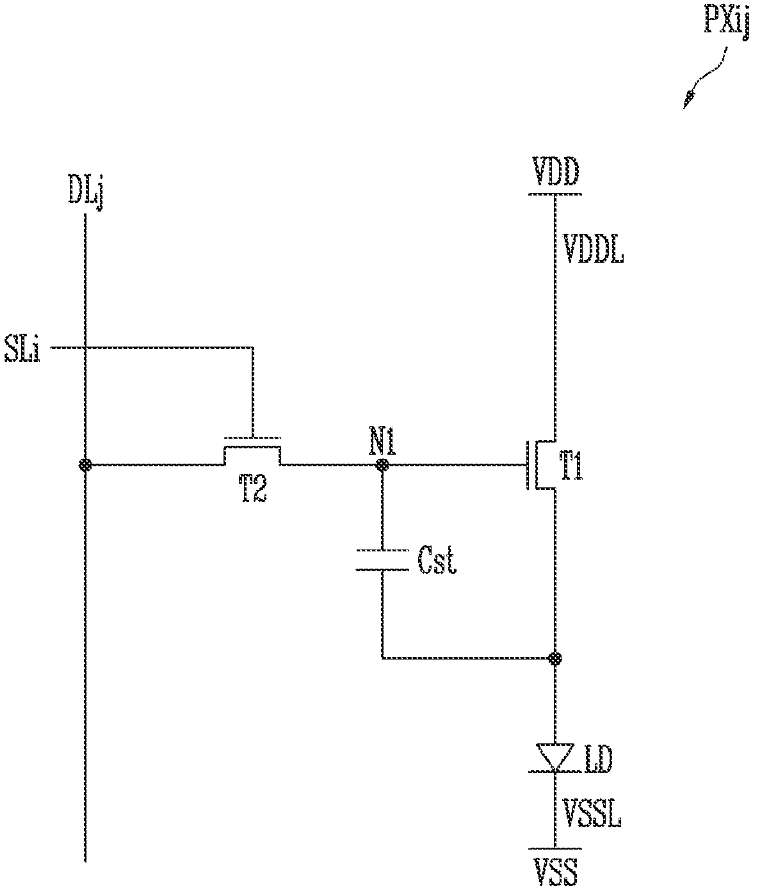
FIG. 2 is a circuit diagram illustrating an example of a pixel included in the display device of FIG. 1.

FIG. 2 is a circuit diagram illustrating an example of a pixel included in the display device of FIG. 1.

Referring to FIG. 2, a pixel PXij may include transistors T1 and T2, a storage capacitor Cst, and a light emitting element LD.

Hereinafter, a circuit including an N-type transistor will be described as an example. However, the inventive concept is not limited thereto. For example, according to embodiments, a circuit including a P-type transistor may be utilized by changing the polarity of a voltage applied to a gate electrode. Similarly, a circuit including a combination of a P-type transistor and an N-type transistor may be utilized. The P-type transistor may generally refer to a transistor in which the amount of conducted current increases when a voltage difference between a gate electrode and a source electrode increases in a negative direction. The N-type transistor may generally refer to a transistor in which the amount of conducted current increases when a voltage difference between a gate electrode and a source electrode increases in a positive direction. The transistors may be configured in various forms, such as, for example, a thin film transistor (TFT), a field effect transistor (FET), or a bipolar junction transistor (BJT).

A first transistor T1 may be connected between the first power source line VDDL to which a first power source voltage VDD is supplied and the light emitting element LD, and a gate electrode thereof may be connected to a first node N1. The first transistor T1 may control the amount of current flowing from the first power source line VDDL to the second power source line VSSL via the light emitting element LD in response to a voltage of the first node N1. The first transistor T1 may be referred to as a driving transistor.

A second transistor T2 may be connected between the data line DLj and the first node N1, and a gate electrode thereof may be connected to the scan line SLi. The second transistor T2 may be turned on when the scan signal is supplied to the scan line SLi to electrically connect the data line DLj to the first node N1. Accordingly, the data signal may be transmitted to the first node N1. The second transistor T2 may be referred to as a scan transistor.

The storage capacitor Cst may be connected between the first node N1 corresponding to the gate electrode of the first transistor T1 and a second electrode of the first transistor T1. The storage capacitor Cst may store a voltage corresponding to a voltage difference between the gate electrode and the second electrode of the first transistor T1.

A first electrode (anode electrode or cathode electrode) of the light emitting element LD may be connected to the second electrode of the first transistor T1, and a second electrode (cathode electrode or anode electrode) of the light emitting element LD may be connected to the second power source line VSSL to which a second power source voltage VSS is supplied. The light emitting element LD may generate light having a predetermined luminance in response to the amount of current (driving current) supplied from the first transistor T1.

The light emitting element LD may be, for example, an organic light emitting diode, an inorganic light emitting diode such as a micro light emitting diode (LED), or a quantum dot light emitting diode. Also, the light emitting element LD may be an element including a combination of an organic material and an inorganic material. FIG. 2 shows an embodiment in which the pixel PXij includes a single light emitting element LD. However, the invention is not limited thereto. For example, according to embodiments, the pixel PXij may include a plurality of light emitting elements, and the plurality of light emitting elements may be connected in series, in parallel, or in series and parallel.

The first power source voltage VDD may be applied to the first power source line VDDL, and the second power source voltage VSS may be applied to the second power source line VSSL. For example, the first power source voltage VDD may be greater than the second power source voltage VSS.

When the scan signal of a turn-on level (here, a logic high level) is applied through the scan line SLi, the second transistor T2 may be turned on. In this case, a voltage corresponding to the data signal applied to the data line DLj may be stored in the first node N1 (or a first electrode of the storage capacitor Cst).

A driving current corresponding to a voltage difference between the first electrode and the second electrode of the storage capacitor Cst may flow between the first electrode and the second electrode of the first transistor T1. Accordingly, the light emitting element LD may emit light with a luminance corresponding to the data signal.

The global current value GC provided by the current sensor 600 of FIG. 1 may be a sum of driving current values flowing through all of the pixels PX of the display panel 100. In addition, since the grayscale values are scaled corresponding to the scale factor SF generated by the scale factor provider 900 of FIG. 1 to adjust the sizes of data signals, driving current values of the pixels PX may be adjusted.

The pixel PXij of FIG. 2 is only an example, and embodiments of the present invention may be applied to pixels implemented with other circuits. For example, the pixel PXij may be turned on by further receiving an emission control signal, and a transistor for electrically connecting the second electrode of the first transistor T1 and the first electrode of the light emitting element LD and/or the first electrode of the first transistor T1 and the first power source line VDDL may be further included. In addition, the pixel PXij may be turned on by a sensing signal supplied through a separate sensing line, and a sensing transistor for sensing a voltage or current applied to the second electrode of the first transistor T1 or the first electrode of the light emitting element LD and transmitting the sensed voltage or current to the sensing line may be further included.

Figure 3:
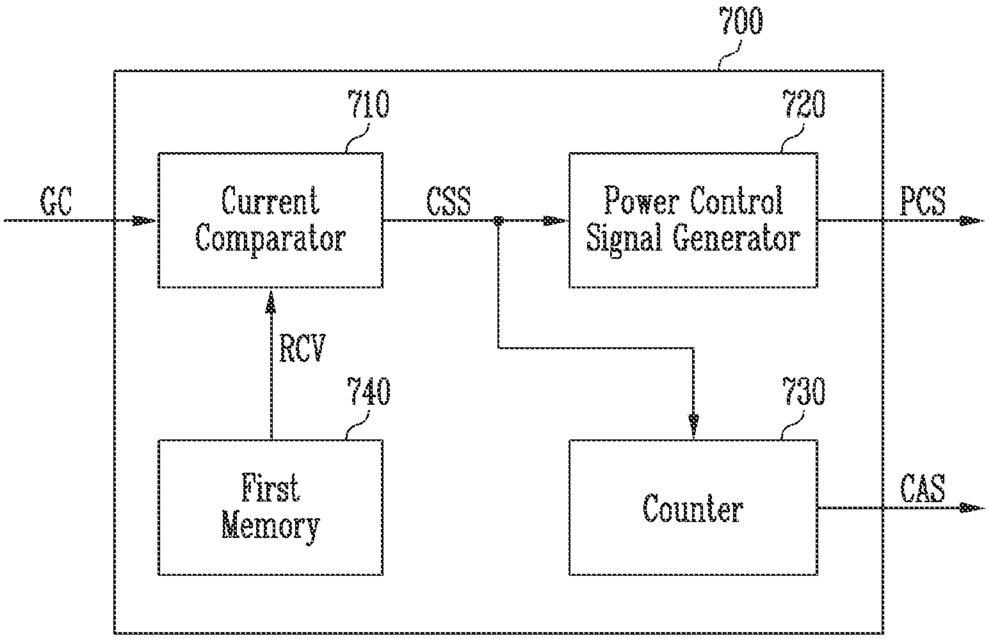
FIG. 3 is a block diagram illustrating an example of a power controller included in the display device of FIG. 1.

FIG. 3 is a block diagram illustrating an example of a power controller included in the display device of FIG. 1.

Referring to FIGS. 1 to 3, the power controller 700 may generate the power control signal PCS and the counting signal CAS based on the global current value GC provided from the current sensor 600. The power controller 700 may provide the power control signal PCS to the power supply 500 and provide the counting signal CAS to the scale factor provider 900.

In an embodiment, the power controller 700 may include a current comparator 710, a power control signal generator 720, and a counter 730. According to an embodiment, the power controller 700 may further include a first memory 740.

The current comparator 710 may generate a current state signal CSS based on the global current value GC.

In an embodiment, the current comparator 710 may generate the current state signal CSS by comparing the global current value GC with a reference current value RCV. For example, when the global current value GC is greater than the reference current value RCV, the current comparator 710 may generate the current state signal CSS indicating whether an overcurrent has occurred. For example, when the global current value GC is equal to or less than the reference current value RCV, the current comparator 710 may generate the current state signal CSS having a first state value (for example, the current state signal CSS of a logic low level). Also, when the global current value GC is greater than the reference current value RCV, the current comparator 710 may generate the current state signal CSS having a second state value (for example, the current state signal CSS of a logic high level).

The reference current value RCV may be stored in the first memory 740 as a predetermined value and may be used to determine whether an overcurrent has occurred, and may be provided from the first memory 740 to the current comparator 710.

The current comparator 710 may provide the current state signal CSS to the power control signal generator 720 and the counter 730.

The power control signal generator 720 may generate the power control signal PCS, which may control the power supply 500 based on the current state signal CSS.

In an embodiment, when it is determined that the global current value GC is equal to or less than the reference current value RCV, the power control signal generator 720 may generate the power control signal PCS, which may control the power supply 500 to generate the first power source voltage VDD having a first voltage level based on the current state signal CSS. In addition, when it is determined that the global current value GC is greater than the reference current value RCV, the power control signal generator 720 may generate the power control signal PCS, which may control the power supply 500 to generate the first power source voltage VDD having a second voltage level smaller than the first voltage level based on the current state signal CSS. For example, when receiving the current state signal CSS having the first state value (for example, the current state signal CSS of the logic low level) from the current comparator 710, the power control signal generator 720 may generate the power control signal PCS, which may control the power supply 500 to generate the first power source voltage VDD having the first voltage level. In addition, when receiving the current state signal CSS having the second state value (for example, the current state signal CSS of the logic high level) from the current comparator 710, the power control signal generator 720 may generate the power control signal PCS, which may control the power supply 500 to generate the first power source voltage VDD having the second voltage level.

The counter 730 may generate the counting signal CAS based on the current state signal CSS. In an embodiment, the counter 730 may generate the counting signal CAS by counting the length of the section in which the global current value GC is greater than the reference current value RCV for a unit time based on the current state signal CSS. For example, the counter 730 may generate the counting signal CAS by counting the length of a section in which the current state signal CSS having the second state value (for example, the current state signal CSS of the logic high level) is received from the current comparator 710 for a unit time.

Figure 4:
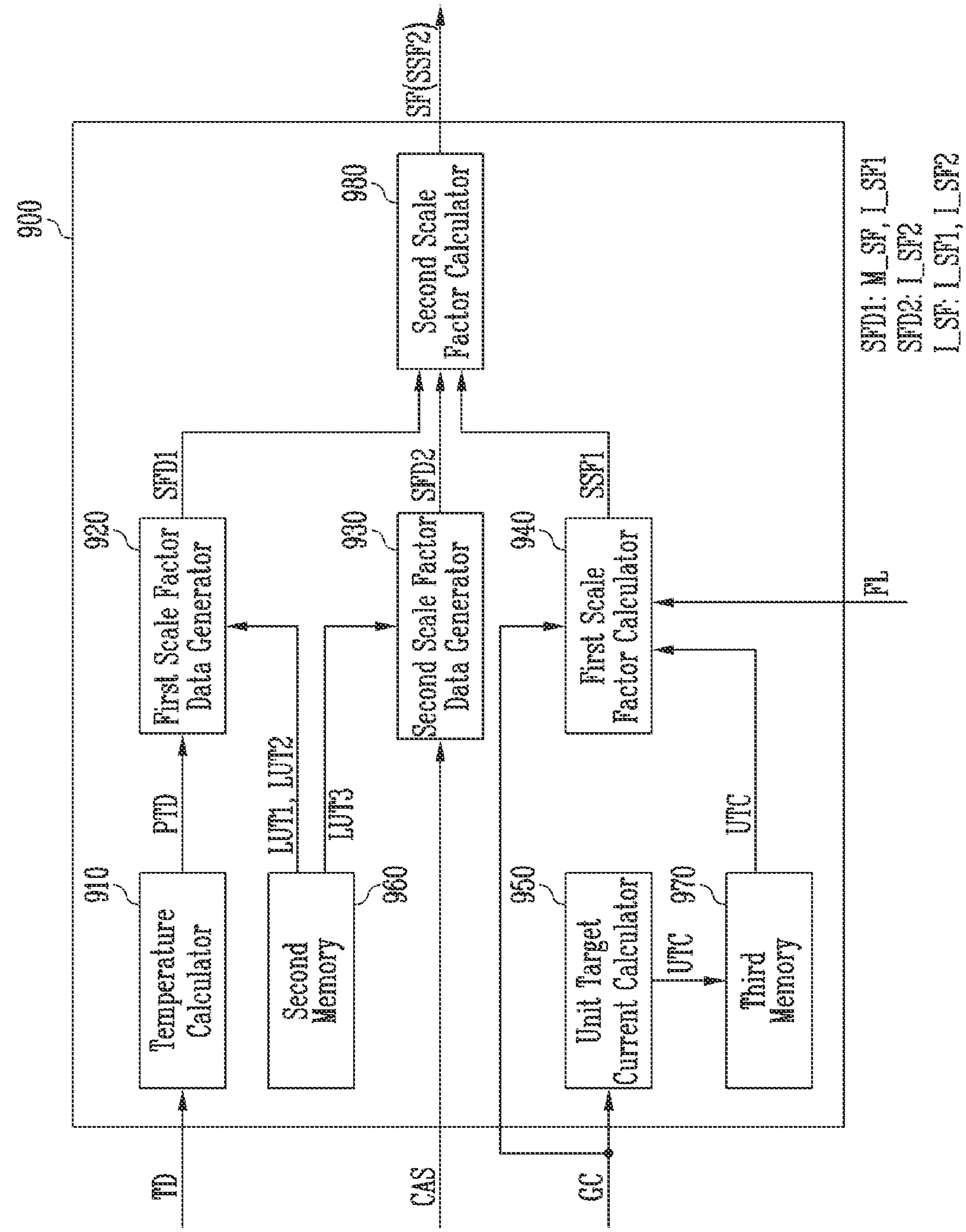
FIG. 4 is a block diagram illustrating an example of a scale factor provider included in the display device of FIG. 1.
Figure 5:
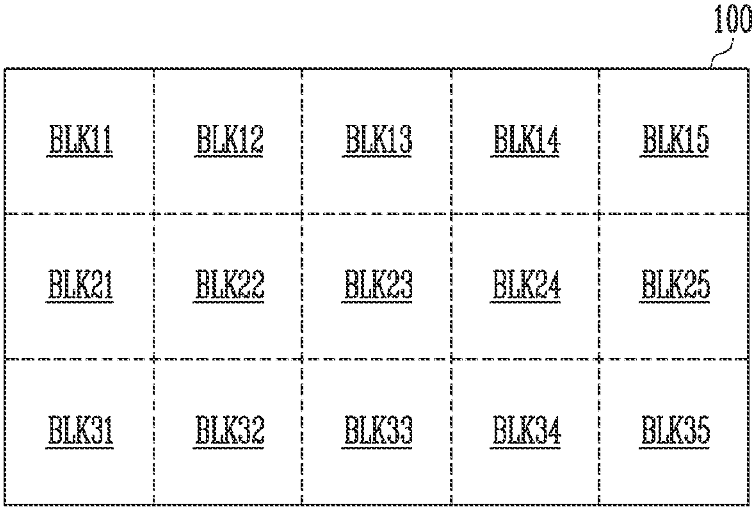
FIG. 5 is a diagram illustrating an example of a display panel included in the display device of FIG. 1.
Figure 6:
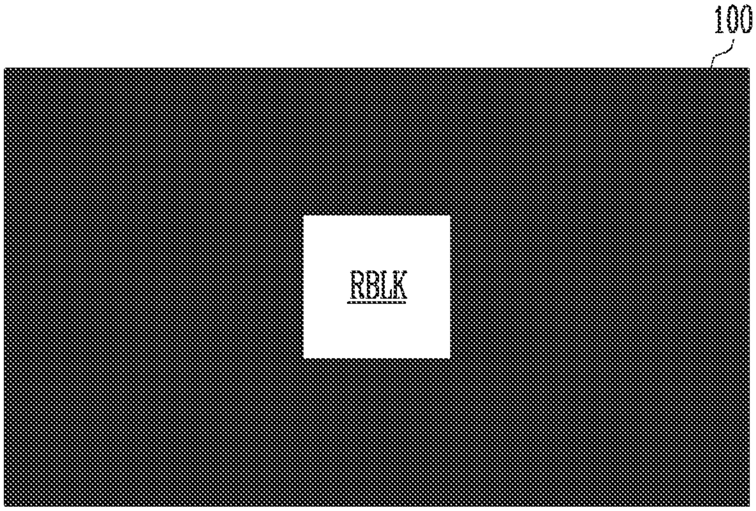
FIG. 6 is a diagram illustrating an example of a reference block set in the display panel of FIG. 5.
Figure 7:
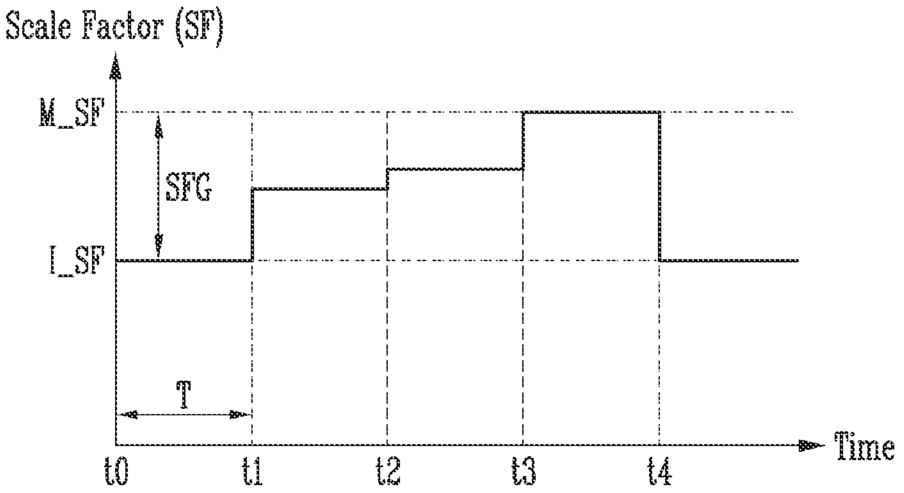
FIG. 7 is a graph illustrating a scale factor according to embodiments of the present invention.
Figure 8A:
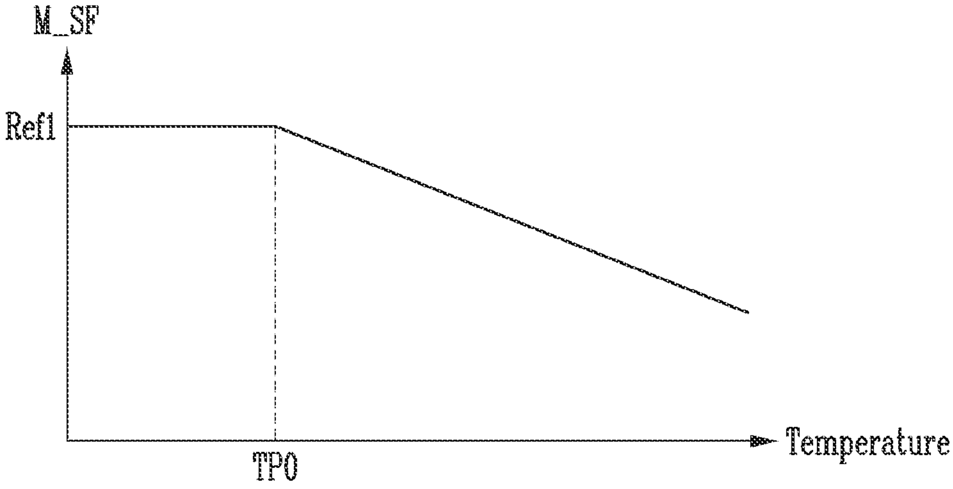
FIGS. 8A to 8C are graphs illustrating examples of a first reference value and a second reference value used to generate the scale factor of FIG. 7.
Figure 8B:
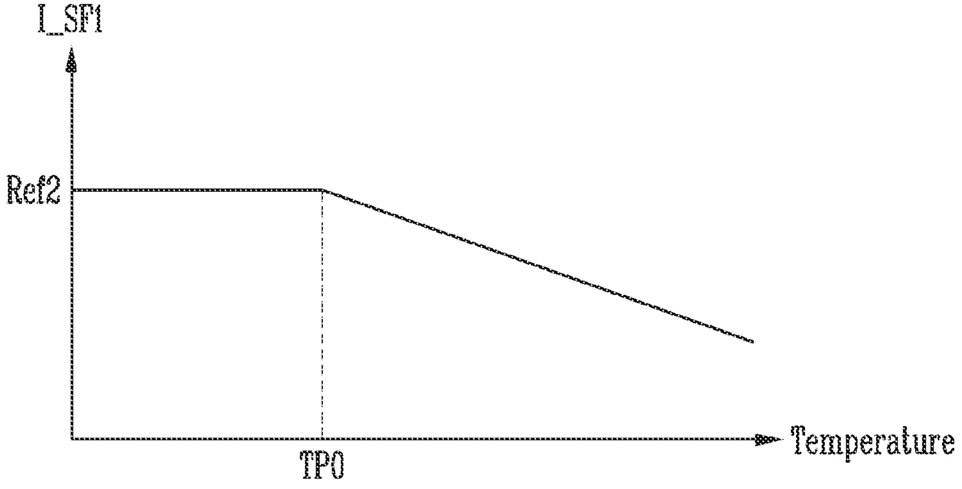
Figure 8C:
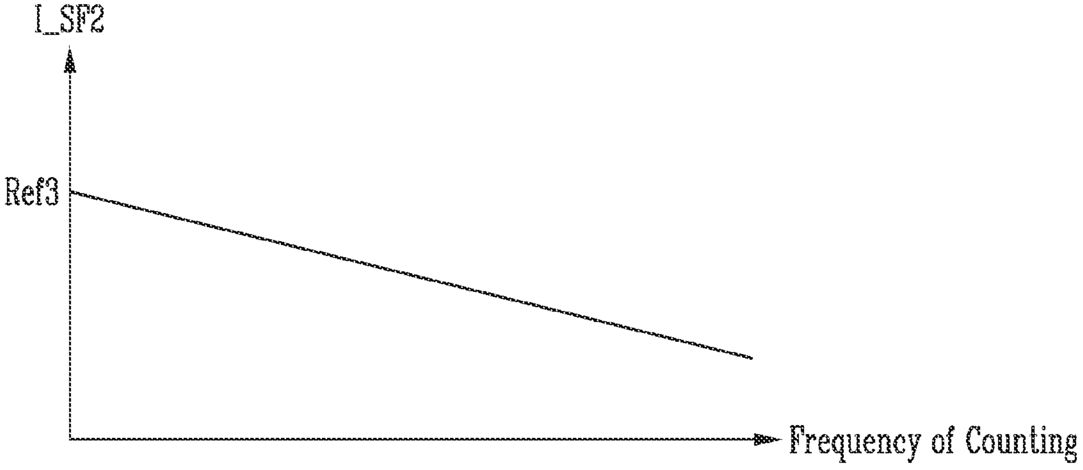

FIG. 4 is a block diagram illustrating an example of a scale factor provider included in the display device of FIG. 1. FIG. 5 is a diagram illustrating an example of a display panel included in the display device of FIG. 1. FIG. 6 is a diagram illustrating an example of a reference block set in the display panel of FIG. 5. FIG. 7 is a graph illustrating a scale factor according to embodiments of the present invention. FIGS. 8A to 8C are graphs illustrating examples of a first reference value and a second reference value used to generate the scale factor of FIG. 7.

Referring to FIGS. 1 to 4, as described with reference to FIG. 1, the display device 1000 (or the scale factor provider 900) may set at least one of blocks as a reference block to perform a unit target current value UTC storage operation.

Referring further to FIG. 5 to describe the reference block in more detail, the pixels PX of the display panel 100 may be divided into a plurality of blocks BLK11, BLK12, BLK13, BLK14, BLK15, BLK21, BLK22, BLK23, BLK24, BLK25, BLK31, BLK32, BLK33, BLK34, and BLK35. Each of the blocks BLK11 to BLK35 may include at least one pixel. The number of blocks BLK11 to BLK35 may be equal to or smaller than the number of pixels.

In an embodiment, the display panel 100 may be divided into the blocks BLK11 to BLK35 having the same size, so that each of the blocks BLK11 to BLK35 may include the same number of pixels. However, this is only an example, and the present invention is not limited thereto. For example, according to embodiments, all or some of the blocks BLK11 to BLK35 may share one or more pixels, and some of the blocks BLK11 to BLK35 may include more pixels than other blocks.

Although FIG. 5 shows an embodiment in which the display panel 100 is divided into 15 blocks BLK11 to BLK35, this is only an example, and the present invention is not limited thereto. For example, according to embodiments, the display panel 100 may be divided into 100 blocks, or into a different number of blocks.

Referring back to FIG. 4, when the display device 1000 is powered on, a reference block among the blocks BLK11 to BLK35 may emit light in the display device 1000. For example, as shown in FIG. 6, a reference block RBLK may correspond to a block (for example, the block BLK23 of FIG. 5) located in the center of the display panel 100. However, this is only an example, and the reference block RBLK may be set in various ways. For example, according to embodiments, the reference block may be set to correspond to a block located outside of the display panel 100. As another example, a plurality of reference blocks may be set among the blocks BLK1 to BLK35.

According to an embodiment, in the display device 1000, pixels included in the reference block RBLK may emit light with the highest grayscale (for example, white grayscale), and pixels included in the remaining blocks do not emit light (for example, black grayscale).

In this case, the current sensor 600 may generate the global current value GC by sensing a current flowing through the first power source line VDDL, and provide the global current value GC to a unit target current value calculator 950 of the scale factor provider 900.

The unit target current value calculator 950 may generate a unit target current value UTC in response to the global current value GC. For example, the unit target current value calculator 950 may store the global current value GC as the unit target current value UTC in the third memory 970. As shown in FIGS. 5 and 6, one (for example, the block BLK23) of the 15 blocks BLK11 to BLK35 may be set as the reference block RBLK. In the display device 1000, when the pixels included in the reference block RBLK emit light with the highest grayscale and the pixels included in the remaining blocks do not emit light, the global current value GC may correspond to the unit target current value UTC corresponding to about 6.67%, which is about 1/15 of a full-white image frame. Alternatively, as in the above example, assuming that the display panel 100 is divided into 100 blocks, the global current value GC may correspond to the unit target current value UTC corresponding to about 1% of the full-white image frame.

In an embodiment of the present invention, the unit target current value UTC may be generated once when the display device 1000 is powered on, stored in the third memory 970 of the scale factor provider 900, and then used during a display period of image frames of the display device 1000.

As described with reference to FIG. 1, the scale factor provider 900 according to embodiments of the present invention may generate the scale factor SF in consideration of the ambient temperature of the display device 1000 (or the display panel 100) and the degree to which the value of the current flowing through the display panel 100 for a unit time becomes greater than the reference current value.

For example, the scale factor provider 900 may set the reference range for determining the scale factor SF according to the ambient temperature of the display device 1000 (or the display panel 100) and the degree to which the value of the current flowing through the display panel 100 for a unit time becomes greater than the reference current value based on the temperature data TD and the counting signal CAS. The scale factor provider 900 may determine a value of the scale factor SF within the reference range. Here, a maximum value of the reference range may be a first reference value M_SF, and a minimum value of the reference range may be a second reference value I_SF. That is, the reference range may have a range between the first reference value M_SF and the second reference value I_SF.

To describe the first reference value M_SF and the second reference value I_SF in more detail, referring to FIG. 7, the scale factor SF according to time is shown in FIG. 7.

As shown in FIG. 7, the value of the scale factor SF may be set for every predetermined period T. That is, the scale factor provider 900 may generate the scale factor SF at every one of time points t0, t1, t2, t3, and t4 corresponding to the predetermined period T and provide the generated scale factor SF to the timing controller 200. Here, the period T may correspond to one frame. However, this is merely an example, and the period T in which the value of the scale factor SF is set may be variously set.

The scale factor SF may have a value within a reference range SFG. For example, the reference range SFG may have the range between the first reference value M_SF and the second reference value I_SF. Accordingly, at each of the time points t0, t1, t2, t3, and t4 corresponding to the predetermined period T, the value of the scale factor SF may be changed within the reference range SFG, or may be maintained at a previous value.

Here, the first reference value M_SF may be determined based on the ambient temperature of the display panel 100, and the second reference value I_SF may be determined based on the ambient temperature of the display device 1000 and/or the degree to which the value of the current flowing through the display panel 100 for a unit time becomes greater than the reference current value. For example, the second reference value I_SF may be set to a smaller value among a (2-1)th reference value I_SF1 determined according to the ambient temperature of the display panel 100 and a (2-2)th reference values I_SF2 determined according to the degree to which the value of the current flowing through the display panel 100 for a unit time becomes greater than the reference current value.

Referring back to FIG. 4, in an embodiment, as the ambient temperature of the display device 1000 (or the display panel 100) increases, the scale factor provider 900 may control the first reference value M_SF and the second reference value I_SF to be decreased based on the temperature data TD. In addition, as the degree to which the value of the current flowing through the display panel 100 for a unit time becomes greater than the reference current value increases, the scale factor provider 900 may control the second reference value I_SF to be decreased based on the counting signal CAS.

Based on the first reference value M_SF and the second reference value I_SF determined in response to the temperature data TD and the counting signal CAS, the scale factor provider 900 may set the reference range SFG and generate the scale factor SF having a value within the reference range SFG.

In an embodiment, the scale factor provider 900 may calculate a first calculated value SSF1 (or a first sub-scale factor) based on the global current value GC provided from the current sensor 600, the frame load value FL provided from the timing controller 200, and the unit target current value UTC, and calculate a second calculated value SSF2 (or a second sub-scale factor) by adjusting the first calculated value SSF1 so that the first calculated value SSF1 is included within the reference range SFG. For example, when the first calculated value SSF1 is included within the reference range SFG, the scale factor provider 900 may generate the second calculated value SSF2 having the same value as the first calculated value SSF1. In addition, when the first calculated value SSF1 is greater than the reference range SFG, the scale factor provider 900 may generate the second calculated value SSF2 having the same value as the first reference value M_SF (that is, a maximum value of the reference range SFG). Also, when the first calculated value SSF1 is less than the reference range SFG, the scale factor provider 900 may generate the second calculated value SSF2 having the same value as the second reference value I_SF (that is, a minimum value of the reference range SFG).

Hereinafter, the operation of the scale factor provider 900 will be described in more detail.

In an embodiment, the scale factor provider 900 may include a temperature calculator 910 (also referred to herein as a temperature calculator circuit), a first scale factor data generator 920 (also referred to herein as a first scale factor data generator circuit), a second scale factor data generator 930 (also referred to herein as a second scale factor data generator circuit), a first scale factor calculator 940 (also referred to herein as a first scale factor calculator circuit), the unit target current value calculator 950 (also referred to herein as a unit target current value calculator circuit), a second memory 960, the third memory 970, and a second scale factor calculator 980 (also referred to herein as a second scale factor calculator circuit).

As described above, the unit target current value calculator 950 may generate the unit target current value UTC in response to the global current value GC, and the third memory 970 may store the unit target current value UTC.

The temperature calculator 910 may receive the temperature data TD from the temperature sensor 800 and generate predicted temperature data PTD of the display panel 100 based on the temperature data TD.

For example, the temperature calculator 910 may calculate the predicted temperature data PTD of the display panel 100 according to the ambient temperature of the display device 1000 (or the display panel 100) corresponding to the temperature data TD. For example, the temperature calculator 910 may generate the predicted temperature data of the display panel 100 by using a lookup table in which predicted temperature data PTD corresponding to the ambient temperature of the display device 1000 (or the display panel 100) is stored. However, this is only an example, and the present invention is not limited thereto. For example, according to embodiments, the temperature calculator 910 may generate the predicted temperature data PTD from the ambient temperature of the display device 1000 (or the display panel 100) corresponding to the temperature data TD by using a separate equation. As another example, the temperature calculator 910 may generate the ambient temperature of the display device 1000 (or the display panel 100) corresponding to the temperature data TD as the predicted temperature data PTD.

The first scale factor data generator 920 may generate first scale factor data SFD1 based on the predicted temperature data PTD.

In an embodiment, the first scale factor data SFD1 may include the first reference value M_SF and the (2-1)th reference value I_SF1. Here, as described above, the first reference value M_SF and the (2-1)th reference value I_SF1 may be used to set the reference range SFG.

The first scale factor data generator 920 may determine the first reference value M_SF based on the predicted temperature data PTD. For example, the first scale factor data generator 920 may determine the first reference value M_SF having a smaller value as the temperature of the display panel 100 is higher than a reference temperature based on the predicted temperature data PTD.

For example, referring further to FIG. 8A, this figure shows a graph of the first reference value M_SF according to the temperature of the display panel 100 (for example, the predicted temperature data PTD).

The first reference value M_SF may have a first value Ref1 up to a reference temperature TP0. The reference temperature TP0 may be room temperature, but this is only an example, and the reference temperature TP0 may be variously set according to the display panel 100. Here, the first value Ref1 may be a predetermined value and may be set to a maximum value that the scale factor SF can have. For example, the first value Ref1 may be set to 1 (or 100%).

Based on the reference temperature TP0, when the temperature of the display panel 100 is higher than the reference temperature TP0, the first reference value M_SF may decrease as the temperature of the display panel 100 increases. That is, the first scale factor data generator 920 may determine the first reference value M_SF as the first value Ref1 when the temperature of the display panel 100 is equal to or less than the reference temperature TP0 based on the predicted temperature data PTD, and may determine the first reference value M_SF having a smaller value as the temperature of the display panel 100 increases when the temperature of the display panel 100 is higher than the reference temperature TP0.

Referring back to FIG. 4, in an embodiment, the first scale factor data generator 920 may determine the first reference value M_SF based on a first lookup table LUT1 provided from the second memory 960. For example, the first lookup table LUT1 may include information on the graph described with reference to FIG. 8A.

The first scale factor data generator 920 may determine the (2-1)th reference value I_SF1 based on the predicted temperature data PTD. For example, the first scale factor data generator 920 may determine the (2-1)th reference value I_SF1 having a smaller value as the temperature of the display panel 100 increases based on the predicted temperature data PTD.

For example, referring further to FIG. 8B, this figure shows a graph of the (2-1)th reference value I_SF1 according to the temperature of the display panel 100 (for example, the predicted temperature data PTD).

The (2-1)th reference value I_SF1 may have a second value Ref2 up to the reference temperature TP0. Here, the second value Ref2 may be a predetermined value and may have a smaller value than the first value Ref1 described with reference to FIG. 8A.

Based on the reference temperature TP0, when the temperature of the display panel 100 is higher than the reference temperature TP0, the (2-1)th reference value I_SF1 may decrease as the temperature of the display panel 100 increases. That is, the first scale factor data generator 920 may determine the (2-1)th reference value I_SF1 as the second value Ref2 when the temperature of the display panel 100 is equal to or less than the reference temperature TP0 based on the predicted temperature data PTD, and may determine the (2-1)th reference value I_SF1 having a smaller value as the temperature of the display panel 100 increases when the temperature of the display panel 100 is higher than the reference temperature TP0.

As described above, when the temperature of the display panel 100 increases, as the mobility of the driving transistor (for example, the first transistor T1 of FIG. 2) of each of the pixels PX increases, the value of the current flowing through the light emitting element (for example, the light emitting element LD of FIG. 2) may increase. Therefore, since an appropriate current is not supplied to the pixels PX, an undesired effect in which the pixels PX emit light with a luminance higher than a target luminance may occur. Here, the first scale factor data generator 920 may determine the first reference value M_SF and the (2-1)th reference value I_SF1 corresponding to the maximum and minimum values of the reference range SFG for setting the scale factor SF based on the temperature of the display panel 100. Therefore, a current having a value different from the target current value may be prevented from flowing through the display panel 100 according to the temperature of the display panel 100, and an appropriate current may be supplied to the pixels PX.

Referring back to FIG. 4, in an embodiment, the first scale factor data generator 920 may determine the (2-1)th reference value I_SF1 based on a second lookup table LUT2 provided from the second memory 960. For example, the second lookup table LUT2 may include information on the graph described with reference to FIG. 8B.

The second scale factor data generator 930 may generate second scale factor data SFD2 based on the counting signal CAS.

In an embodiment, the second scale factor data SFD2 may include a (2-2)th reference value I_SF2. Here, as described above, the (2-2)th reference value I_SF2 may be used to set the reference range SFG.

The second scale factor data generator 930 may determine the (2-2)th reference value I_SF2 based on the counting signal CAS. As an example, the second scale factor data generator 930 may determine the (2-2)th reference value I_SF2 having a smaller value as the length of the section in which the global current value GC is greater than the reference current value for a unit time increases, based on the counting signal CAS.

For example, referring further to FIG. 8C, this figure shows a graph of the (2-2)th reference value I_SF2 according to the degree (or frequency) to which the global current value GC is greater than the reference current value for a unit time.

The (2-2) reference value I_SF2 may have a third value Ref3 based on a case in which there is no section in which the global current value GC is greater than the reference current value during one unit time. For example, when the counter 730 described with reference to FIG. 3 receives only the current state signal CSS having the first state value (for example, the current state signal CSS of the logic low level) for a unit time to generate the counting signal CAS, the second scale factor data generator 930 may determine the (2-2)th reference value I_SF2 having the third value Ref3. Here, the third value Ref3 may be a predetermined value and may have a smaller value than the first value Ref1 described with reference to FIG. 8A.

As the length of the section in which the global current value GC is greater than the reference current value for a unit time increases, the (2-2)th reference value I_SF2 may decrease. That is, the second scale factor data generator 930 may determine the (2-2)th reference value I_SF2 having a smaller value as the length of the section in which the global current value GC is greater than the reference current value for a unit time increases (for example, as the length of the section in which the current state signal CSS received from the current comparator 710 has the second state value (for example, logic high level) in the counter 730 of FIG. 3 increases), based on the counting signal CAS.

As described above, when the value of the current flowing through the display panel 100 increases as the ambient temperature of the display device 1000 increases, the frequency with which the voltage level of the first power source voltage supplied to the first power source line VDDL is changed may increase according to the operation of the power controller 700, which may prevent or reduce overcurrent from occurring, as described above. Here, the second scale factor data generator 930 may determine the (2-2)th reference value I_SF2 corresponding to the minimum value of the reference range SFG for setting the scale factor SF based on the degree to which the value of the current flowing through the display panel 100 for a unit time becomes greater than the reference current value. Therefore, a phenomenon in which the display quality of an image is deteriorated may be reduced or eliminated by increasing the frequency in which the luminance of the image displayed by the display panel 100 is unintentionally changed according to the operation of the power controller 700.

Referring back to FIG. 4, according to an embodiment, the second scale factor data generator 930 may determine the (2-2)th reference value I_SF2 based on a third lookup table LUT3 provided from the second memory 960. For example, the third lookup table LUT3 may include information on the graph described with reference to FIG. 8C.

The first scale factor calculator 940 may determine the target current value based on the unit target current value UTC and the frame load value FL provided from the timing controller 200. For example, the first scale factor calculator 940 may determine the target current value by multiplying the unit target current value UTC and the frame load value FL. In addition, the first scale factor calculator 940 may generate the first calculated value SSF1 (or the first sub-scale factor) by comparing the target current value with the global current value GC provided from the current sensor 600. For example, the first scale factor calculator 940 may determine a ratio between the target current value and the global current value GC as the first calculated value SSF1.

The first scale factor calculator 940 may provide the first calculated value SSF1 (or the first sub-scale factor) to the second scale factor calculator 980.

The second scale factor calculator 980 may set the reference range SFG for determining the scale factor SF based on the first scale factor data SFD1 and second scale factor data SFD2.

For example, the second scale factor calculator 980 may determine a smaller value among the (2-1)th reference value I_SF1 determined based on the ambient temperature of the display panel 100 and the (2-2)th reference value I_SF2 included in the second scale factor data SFD2 and determined based on the degree to which the value of the current flowing through the display panel 100 for a unit time becomes greater than the reference current value, as the second reference value I_SF based on the first scale factor data SFD1 and the second scale factor data SFD2. Also, the second scale factor calculator 980 may set the reference range SFG based on the first reference value M_SF and the second reference value I_SF. For example, the second scale factor calculator 980 may determine the reference range SFG as the range between the first reference value M_SF and the second reference value I_SF.

In an embodiment, the second scale factor calculator 980 may calculate the second calculated value SSF2 (or the second sub-scale factor) based on the determined reference range SFG and the first calculated value SSF1 (or the first sub-scale factor) provided from the first scale factor calculator 940.

For example, the second scale factor calculator 980 may calculate the second calculated value SSF2 (or the second sub-scale factor) by adjusting the first calculated value SSF1 so that the first calculated value SSF1 is included within the reference range SFG. For example, as described above, when the first calculated value SSF1 is included within the reference range SFG, the second scale factor calculator 980 may generate the second calculated value SSF2 having the same value as the first calculated value SSF1. As another example, when the first calculated value SSF1 is greater than the reference range SFG, the second scale factor calculator 980 may generate the second calculated value SSF2 having the same value as the first reference value M_SF (that is, the maximum value of the reference range SFG). As another example, when the first calculated value SSF1 is less than the reference range SFG, the second scale factor calculator 980 may calculate the second calculated value SSF2 having the same value as the second reference value I_SF (that is, the minimum value of the reference range SFG).

The second scale factor calculator 980 may provide the second calculated value SSF2 (or the second sub-scale factor) as the scale factor SF to the timing controller 200.

As described with reference to FIGS. 1 to 8C, the scale factor provider 900 (or the display device 1000) according to embodiments of the present invention may perform the global current control operation in consideration of the ambient temperature of the display device 1000 (or the display panel 100) and the degree to which the value of the current flowing through the display panel 100 for a unit time becomes greater than the reference current value. Accordingly, an undesired effect in which a current having a value different from the target current value flows to the display panel 100 according to the temperature of the display panel 100 may be prevented or reduced. Therefore, an appropriate current corresponding to the target current value may be supplied to the pixels PX, and a phenomenon in which the display quality of an image is unintentionally deteriorated due to the operation of the power controller 700 may be reduced or eliminated.

Figure 9A:
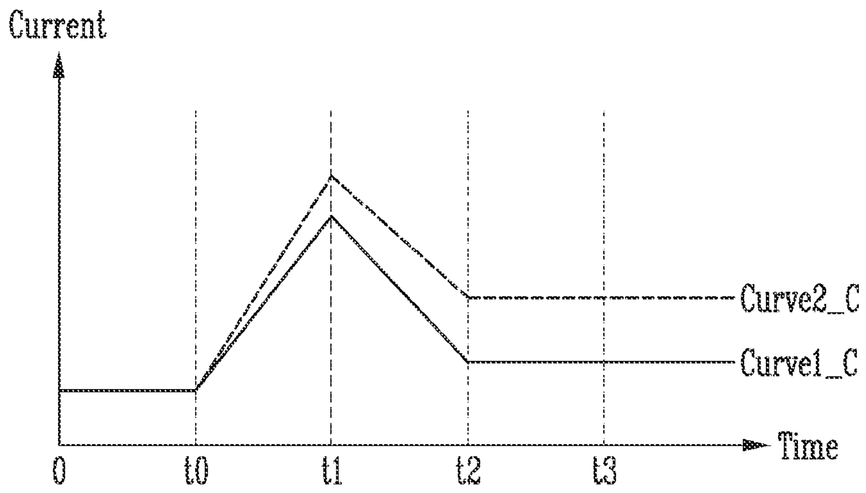
FIG. 9A is a graph illustrating a change in current for each temperature according to a comparative example.
Figure 9B:
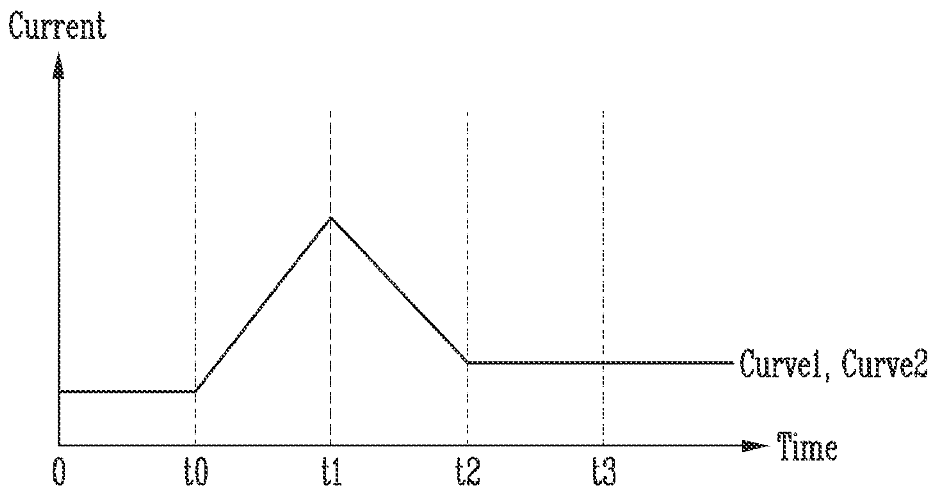
FIG. 9B is a graph illustrating a change in current for each temperature according to embodiments of the present invention.

FIG. 9A is a graph illustrating a change in current for each temperature according to a comparative example. FIG. 9B is a graph illustrating a change in current for each temperature according to embodiments of the present invention.

First, referring to FIG. 9A, this figure shows a first graph Curve1_C showing a current flowing through the display panel at room temperature according to the comparative example and a second graph Curve2_C showing a current flowing through the display panel at a high temperature (for example, a temperature higher than room temperature) according to the comparative example.

In the graph of FIG. 9A, an example in which a full-black image is displayed on the display panel until a reference time point t0, and a full-white image is displayed on the display panel at first to third time points t1, t2, and t3 after the reference time point t0, will be described.

As described above, when the ambient temperature increases, as the mobility of the driving transistor included in the pixel increases, the value of the current flowing through the light emitting element via the driving transistor may increase. For example, as shown in FIG. 9A, when the full-white image having a relatively high frame load value is displayed on the display panel (for example, after the reference time point t0), a difference between a value of the current flowing through the display panel at room temperature (for example, the value of the first graph Curve1_C) and a value of the current flowing through the display panel at the high temperature (for example, the value of the second graph Curve2_C) may be larger.

Next, referring to FIG. 9B, this figure shows a first graph Curve1 showing a current flowing through the display panel (for example, the display panel 100 of FIG. 1) at room temperature according to embodiments of the present invention (for example, the global current value GC sensed by the current sensor 600 of FIG. 1) and a second graph Curve2 showing a current flowing through the display panel (for example, the display panel 100 of FIG. 1) at a high temperature (for example, a temperature higher than room temperature) according to embodiments of the present invention (for example, the global current value GC sensed by the current sensor 600 of FIG. 1). Each of the first graph Curve1 and the second graph Curve2 shown in FIG. 9B shows the value of the current flowing through the display panel 100 (for example, the global current value GC sensed by the current sensor 600 of FIG. 1) in response to the operation of the scale factor provider 900 (or the display device 1000) according to embodiments of the present invention described with reference to FIGS. 1 to 8C under room temperature and high temperature conditions.

In the graph of FIG. 9B, an example in which a full-black image is displayed on the display panel (for example, the display panel 100 of FIG. 1) until the reference time point t0, and a full-white image is displayed on the display panel (for example, the display panel 100 of FIG. 1) at the first to third time points t1, t2, and t3 after the reference time point t0, will be described.

As described with reference to FIGS. 1 to 8C, the scale factor provider 900 (or the display device 1000) according to embodiments of the present invention may perform the global current control operation by changing the reference range SFG for setting the scale factor SF in consideration of the ambient temperature of the display device 1000 (or the display panel 100). Accordingly, as shown in FIG. 9B, the value of the current flowing through the display panel 100 under the room temperature condition (for example, the value of the first graph Curve1) and the value of the current flowing through the display panel 100 under the high temperature condition (for example, the value of the second graph Curve2) may be substantially the same. That is, a constant current corresponding to the target current value may be supplied to the pixels PX regardless of the ambient temperature of the display device 1000 (or the display panel 100).

Figure 10A:
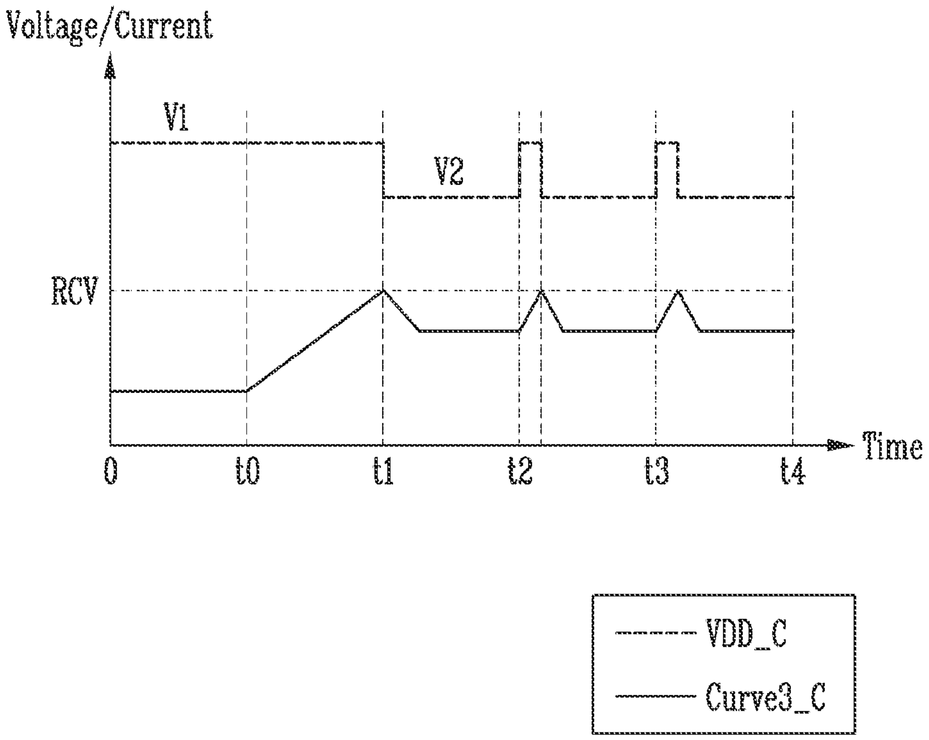
FIG. 10A is a graph illustrating a change in a first power source voltage according to a comparative example.
Figure 10B:
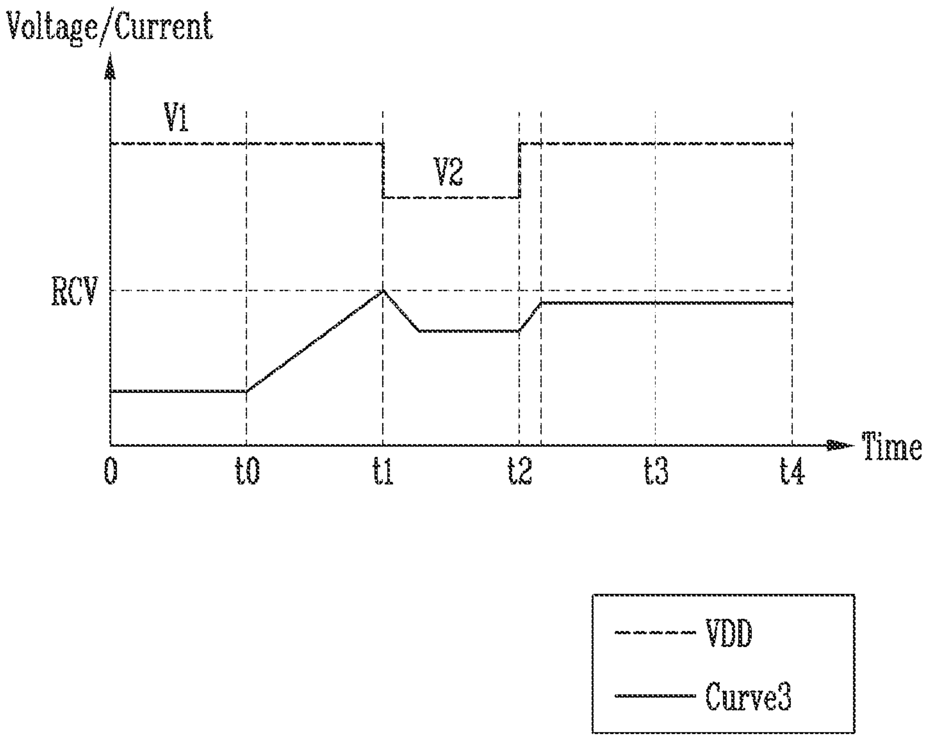
FIG. 10B is a graph illustrating a change in a first power source voltage according to embodiments of the present invention.

FIG. 10A is a graph illustrating a change in a first power source voltage according to a comparative example. FIG. 10B is a graph illustrating a change in a first power source voltage according to embodiments of the present invention.

First, referring to FIG. 10A, this figure shows a graph showing a first power source voltage VDD_C according to the comparative example and a third graph Curve3_C showing the current flowing through the display panel according to the voltage level of the first power source voltage VDD_C.

In the graph of FIG. 10A, an example in which a full-black image is displayed on the display panel until the reference time point t0, and a full-white image is displayed on the display panel at the first to third time points t1, t2, and t3 after the reference time point t0, will be described.

The graphs shown in FIG. 10A show values (that is, the first power source voltage VDD_C and the current flowing through the display panel) measured according to the driving of the display device according to the comparative example under a high temperature condition (for example, a temperature higher than room temperature).

As described above, when the value of the current flowing through the display panel increases as the ambient temperature of the display device increases, according to the operation of the display device (or the power controller), which may reduce or prevent overcurrent from occurring, the frequency with which the voltage level of the first power source voltage VDD_C supplied to the first power source line is changed may increase. For example, as shown in FIG. 10A, when the full-white image having a relatively high frame load value is displayed on the display panel after the reference time point t0, the current flowing through the display panel may increase as shown in the third graph Curve3_C. Here, when the current flowing through the display panel is greater than the reference current value RCV, the display device according to the comparative example may change (for example, decrease) the voltage level of the first power source voltage VDD_C from a first voltage level V1 to a second voltage level V2. Also, when the current flowing through the display panel is less than the reference current value RCV, the display device according to the comparative example may change (for example, increase) the voltage level of the first power source voltage VDD_C from the second voltage level V2 to the first voltage level V1. Here, when the ambient temperature of the display device is relatively high, the value of the current flowing through the display panel increases, and as shown in FIG. 10A, according to the operation of the display device (or the power controller), which may prevent or reduce overcurrent from occurring, the frequency with which the voltage level of the first power source voltage VDD_C supplied to the first power source line is changed may increase. In this case, the display quality of an image may be deteriorated.

Next, referring to FIG. 10B, this figure shows a graph showing the first power source voltage VDD according to embodiments of the present invention and the third graph Curve3 showing the current flowing through the display panel (for example, the display panel 100 of FIG. 1) according to the voltage level of the first power source voltage VDD (for example, the global current value GC sensed by the current sensor 600 of FIG. 1).

In the graph of FIG. 10B, an example in which a full-black image is displayed on the display panel until the reference time point t0, and a full-white image is displayed on the display panel at the first to third time points t1, t2, and t3 after the reference time point t0, will be described.

The graphs shown in FIG. 10B show values (that is, the first power source voltage VDD and the current flowing through the display panel 100) measured according to the driving of the display device 1000 according to embodiments of the present invention under a high temperature condition (for example, a temperature higher than room temperature).

As described with reference to FIGS. 1 to 8C, the scale factor provider 900 (or the display device 1000) according to embodiments of the present invention may perform the global current control operation by changing the reference range SFG for setting the scale factor SF in consideration of the ambient temperature of the display device 1000 (or the display panel 100) and the degree to which the value of the current flowing through the display panel 100 for a unit time becomes greater than the reference current value. Accordingly, as shown in FIG. 10B, since the value of the scale factor SF is controlled according to the reference range SFG controlled by the operation of the scale factor provider 900 in a high temperature condition with a relatively high temperature (for example, since the maximum and minimum values of the reference range SFG decrease and the value of the scale factor SF decreases, as the ambient temperature of the display panel 100 and the degree to which the value of the current flowing through the display panel 100 for a unit time becomes greater than the reference current value increases), the value of the current flowing through the display panel 100 (for example, the value of the third graph Curve3) may decrease. Therefore, a phenomenon in which the frequency with which the voltage level of the first power source voltage VDD supplied to the first power source line VDDL is changed is unintentionally increased may be reduced or eliminated. Accordingly, an undesired effect (for example, a flicker phenomenon) in which the display quality of an image is unintentionally deteriorated due to the operation of the power controller 700, which is utilized to prevent or reduce overcurrent from occurring, may be reduced or eliminated.

The display device according to embodiments of the present invention may perform the global current control operation in consideration of the ambient temperature of the display device (or the display panel) and the degree to which the value of the current flowing through the display panel for a unit time becomes greater than the reference current value.

Accordingly, an undesired effect in which a current having a value different from the target current value flows to the display panel according to the temperature of the display panel may be reduced or prevented. Accordingly, an appropriate current corresponding to the target current value may be supplied to the pixels, and a phenomenon in which the display quality of an image is unintentionally deteriorated due to the operation of the power controller may be reduced or eliminated.

In a display device, even if a data signal having the same value is supplied to a pixel, a current flowing through the pixel may be changed according to a change in ambient temperature. Embodiments of the present invention may select an appropriate supply current in consideration of such a change in ambient temperature.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

However, effects of the present invention are not limited to the above-described effects, and may be variously extended without departing from the spirit and scope of the present invention.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:

a display panel including a plurality of pixels;

a timing controller that calculates a frame load value corresponding to an image frame of input image data and generates image data by scaling grayscale values of the input image data using a scale factor;

a data driver that generates a data signal corresponding to the image data and supplies the data signal to the pixels; and a scale factor generating circuit that sets a reference range based on a temperature of the display panel and a global current value that flows through the pixels, and generates the scale factor included within the reference range based on the frame load value and the global current value, wherein a maximum value of the reference range is a first reference value, and a minimum value of the reference range is a second reference value, wherein the scale factor generating circuit determines the first reference value as a first value and determines the second reference value as a second value different from the first value when the temperature of the display panel is equal to or less than a reference temperature, and wherein the scale factor generating circuit determines the first reference value and the second reference value having smaller values as the temperature of the display panel increases when the temperature of the display panel is higher than the reference temperature.

2. The display device of claim 1, wherein the scale factor generating circuit determines the first reference value and the second reference value according to the temperature of the display panel.

3. The display device of claim 2, wherein the first value has a value of 1, and the second value has a value smaller than the first value.

4. The display device of claim 2, wherein the reference temperature corresponds to a room temperature.

5. The display device of claim 1, wherein the scale factor generating circuit determines the second reference value by comparing the global current value with a reference current value.

6. The display device of claim 5, wherein the scale factor generating circuit determines the second reference value having a smaller value as a length of a section in which the global current value is greater than the reference current value for a unit time increases.

7. The display device of claim 1, wherein the display panel is divided into a plurality of blocks, and wherein the scale factor generating circuit includes a unit target current value generator circuit that generates a unit target current value based on the global current value corresponding to a reference block among the blocks.

8. The display device of claim 7, wherein the scale factor generating circuit further includes:

a first scale factor data generator circuit that generates first scale factor data including the first reference value and a (2-1)th reference value based on the temperature of the display panel; and a second scale factor data generator circuit that generates second scale factor data including a (2-2)th reference value based on a counting signal generated by comparing the global current value with the reference current value.

9. The display device of claim 8, wherein the scale factor generating circuit further includes:

a first scale factor calculator circuit that generates a target current value based on the unit target current value and the frame load value, and generates a first calculated value based on the target current value and the global current value.

10. The display device of claim 9, wherein the scale factor generating circuit further includes:

a second scale factor calculator circuit that generates a second calculated value corresponding to the scale factor based on the first scale factor data, the second scale factor data, and the first calculated value.

11. The display device of claim 10, wherein the second scale factor calculator circuit determines a smaller value among the (2-1)th reference value and the (2-2)th reference value as the second reference value.

12. The display device of claim 10, wherein the second scale factor calculator circuit generates the second calculated value having a same value as the first calculated value when the first calculated value is included within the reference range.

13. The display device of claim 10, wherein the second scale factor calculator circuit generates the second calculated value having a same value as the first reference value when the first calculated value is greater than the reference range.

14. The display device of claim 10, wherein the second scale factor calculator circuit generates the second calculated value having a same value as the second reference value when the first calculated value is less than the reference range.

15. A display device, comprising:

a display panel including a plurality of pixels, a timing controller that calculates a frame load value corresponding to an image frame of input image data and generates image data by scaling grayscale values of the input image data using a scale factor;

a data driver that generates a data signal corresponding to the image data and supplies the data signal to the pixels;

a scale factor generating circuit that sets a reference range based on a temperature of the display panel and a global current value that flows through the pixels, and generates the scale factor included within the reference range based on the frame load value and the global current value, a power supply that supplies a first power source voltage and a second power source voltage different from the first power source voltage to the display panel; and a power controller that generates a power control signal that controls the power supply based on a comparison result of the global current value and the reference current value, wherein the power supply reduces a voltage level of the first power source voltage based on the power control signal when the global current value is greater than the reference current value.

16. A method of driving a display device including a display panel including a plurality of pixels, the method comprising:

calculating a frame load value corresponding to an image frame of input image data;

setting a reference range based on a temperature of the display panel and a global current value flowing through the pixels;

generating a scale factor included within the reference range based on the frame load value and the global current value, wherein a maximum value of the reference range is a first reference value, and a minimum value of the reference range is a second reference value;

generating image data by scaling grayscale values of the input image data using the scale factor; and generating a data signal corresponding to the image data and supplying the data signal to the pixels, wherein when the temperature of the display panel is equal to or less than a reference temperature, the method comprises:

determining the first reference value as a first value and determining the second reference value as a second value different from the first value, and wherein when the temperature of the display panel is higher than the reference temperature the method comprises:

determining the first reference value and the second reference value having smaller values as the temperature of the display panel increases.

17. The method of claim 16, wherein the first reference value is determined according to the temperature of the display panel, and wherein the second reference value is determined according to the temperature of the display panel and a comparison result of the global current value and a reference current value.

* * * * *